United States Patent
Dursch et al.

[11] 3,876,601
[45] Apr. 8, 1975

[54] PHOSPHORUS COMPOUNDS CONTAINING CARBAMATE GROUPS

[75] Inventors: Walter Dursch, Schneidhain, Taunus; Fritz Linke, Konigstein, Taunus; Claus Beermann, Wildsachsen; Ehrenfried Nischwitz, Reifenberg, Taunus, all of Germany

[73] Assignee: Hoechst Aktiengesellschaft, Frankfurt am Main, Germany

[22] Filed: Oct. 5, 1973

[21] Appl. No.: 404,096

[30] Foreign Application Priority Data
Oct. 7, 1972 Germany............................ 2249321

[52] U.S. Cl. ............ 260/938; 106/15 FD; 117/136; 260/248 NS; 260/932
[51] Int. Cl. .................................... C07f 9/40
[58] Field of Search............................ 260/932, 938

[56] References Cited
UNITED STATES PATENTS
2,998,347   8/1961   Fancher et al.................. 260/938 X
3,763,283   10/1973  Curgan ............................. 260/938

Primary Examiner—Lorraine A. Weinberger
Assistant Examiner—Richard L. Raymond
Attorney, Agent, or Firm—Connolly and Hutz

[57] ABSTRACT

Phosphonic or phosphinic acid esters containing in the alcohol moiety a carbamate group are obtained by trans-esterifying an alkyl or alkenyl phosphonate or phosphinate with an alkanol carrying in terminal position a carbamate group and reacting the so-obtained phosphonate or phosphinate with a component carrying one to three active vinyl or propenyl groups, such as acrylonitrile, divinylsulfone or tris-acryloyl-hexahydro-1,3,5-triazine. The products are useful for rendering fibrous materials flame-retardant or flame-proof. They may be used directly or after reacting them with formaldehyde.

8 Claims, No Drawings

PHOSPHORUS COMPOUNDS CONTAINING CARBAMATE GROUPS

Compounds of the formula

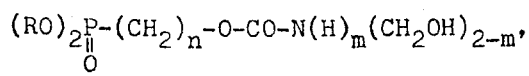

in which R is alkyl having 1 to 4 carbon atoms, $n$ represents integers from 1 to 6 and $m$ represents 0, 1 or 2, and their use as flame-proofing agents for fibrous materials are already known (German Offenlegungsschrift No. 1,930,308).

It has now been found that flame-proofing agents for fibre materials which are capable of being fixed washproof and which correspond to the formula I

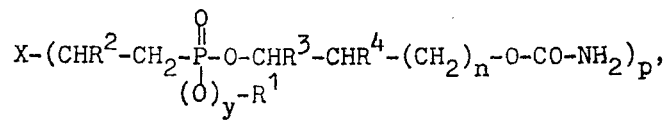

in which $R^1$ represents alkenyl having 3 or 4 carbon atoms or preferably alkyl having 1 to 4 carbon atoms, $R^2$, $R^3$ and $R^4$ represent hydrogen atoms or methyl, $n$ represents an integer of 0 to 2, preferably 0, $y$ represents 0 or 1, $p$ is an integer of from 1 to 3 and X, depending on the meaning of $p$, represents

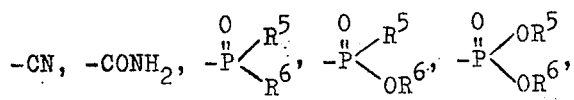

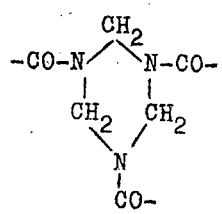

wherein $R^5$, $R^6$ and $R^7$ have the meaning of $R^1$, and $R^8$ and $R^9$ have the meaning of $R^2$, and $q$ stands for an integer of 1 to 6, as well as the N-methylol derivatives of these compounds, preferably the N-methylol derivatives deriving from $-CO-NH_2$ and/or $-SO_2-NH_2$ -groups, can be obtained by reacting a compound of the formula

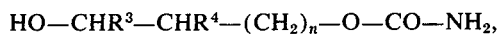

wherein $R^3$, $R^4$ and $n$ have the meanings already mentioned, in the presence of alkaline catalysts with a compound of the formula

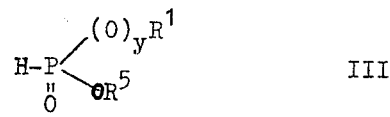

wherein $R^1$, $R^5$ and $y$ have the above meanings, at temperatures of from 0° to 180°C and subsequently reacting $p$ mols of the compound thus obtained of the formula

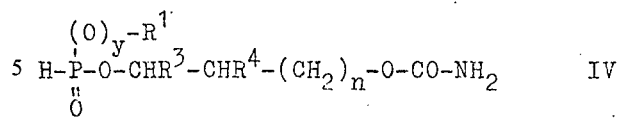

wherein $R^1$, $R^3$, $R^4$, $n$ and $y$ have the above meanings, in the presence of alkaline catalysts, with a compound of the formula

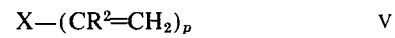

wherein $R^2$, X and $p$ have the meanings mentioned, and optionally converting the compound thus obtained of the formula I into the N-methylol derivatives.

In the first reaction step the alkaline catalysts are expediently used in concentrations of 0.1 to 5 percent by weight, preferably 0.5 to 3 percent, calculated on the compound of the formula III. The temperatures preferably range between 15° and 160°C, especially between 30° and 120°C. The phosphites or phosphonites thus formed of the formula IV are also reacted in the presence of alkaline catalysts, expediently in concentrations of 0.1 to 4 percent by weight, preferably 0.3 to 2 percent by weight, calculated on the phosphorus compound of the formula III, with at least 1 mol, preferably 1.0 to 1.2 mol of the unsaturated compound of the formula V.

The products of the formula I obtained according to the process are generally obtained with a good purity, and, if at all, only contaminated by traces of non-reacted starting materials, the elimination of which is not required for the use as flame-proofing agents. After methylolization the methylolization products are obtained as aqueous solutions, from which they can be isolated according to known methods. However, it is preferable to use these aqueous solutions directly for preparing finishing baths as they are described below, to provide textiles with a flame-proof finish.

Furthermore, the invention relates to the use of the compounds of the formula I or of the products obtained by reacting compounds of the formula II with compounds of the formula III and subsequently with compounds of the formula V or to the use of the methylol compounds obtained from these products by formalization or of their aqueous solutions, for the flame-proof finishing of textiles.

In contradistinction to the known carbamates containing phosphorus the substances of this invention have the advantage that the radical X may be varied within wide limits and that the character of the carbamates and, thus, of the finishes obtained with them can be adjusted to a large extent to the corresponding requirements.

Another essential advantage is that the compounds of the present invention are very easily accessible according to simple one- pot processes and that, besides alcohols easy to be recovered, there are no other by-products.

However, when preparing the compounds which contain the carbamate radical bound via a P—C— bond, the use of phosgene and ammonia is necessary and thus the formation of ammonium chloride is inevitable, the working-up of which is generally uneconomical. Furthermore, there are required a suction-filtering process and a complicated washing process with organic solvents which have to be worked up subsequently.

As carbamates of the formula II carrying hydroxy groups may be considered above all:

4-hydroxy-butyl-carbamate-(1), 3-hydroxy-propyl-carbamate-(1), 2-hydroxy-1-methyl-ethyl-carbamate-(1), 3-hydroxy-n-butyl-carbamate-(1), 3-hydroxy-2-methyl-propyl-carbamate-(1) and for commercial reasons especially the 2-hydroxyethyl-carbamate-(1) which is very easily accessible from ethylene carbonate and ammonia in a nearly 100 percent yield.

The following phosphorus compounds of the formula III are particularly suitable:

Di-n-propyl-phosphite, di-isopropyl-phosphite, di-isobutyl-phosphite, di-n-butyl-phosphite or mixed phosphites, such as methyl-ethyl-phosphite, methyl-butyl-, methyl-isobutyl-, ethyl-butyl-phosphite, furthermore methane-phosphonous acid methyl ester, methane-phosphonous acid ethyl ester, methane-phosphonous acid isobutyl ester, ethane-phosphonous acid-isopropyl ester, n-butanephosphonous acid ethyl ester, isobutane-phosphonous acid allyl ester and, for economical reasons, especially the dimethyl or diethyl phosphite.

As alkaline catalysts may be used for example alkali metals such as especially sodium or potassium, alkali metal amides such as sodium amide, alkali metal hydrides, tertiary alkali metal phosphates, sodium carbonate, potassium carbonate, and preferably alkali metal alcoholates such as sodium methylate, sodium ethylate, etc.

Since the esters III containing phosphorus are sensitive towards alkaline reactants, especially at elevated temperatures, the use of relatively low temperatures of 0° to 140°C, preferably 30° to 120°C is recommended in some cases for transesterification.

The elimination of the alcohols split off during transesterification from the reaction mixture is preferably carried out in vacuo, for example at about 0.1 to 400 mm mercury, preferably 0.3 to 200 mm mercury. Per mol of phosphorus compound III, about 1 mol of alcohol is distilled off. The course of the reaction can be easily observed, for example by determining the refraction index or by isolating the alcohol distilled off, if desired in a refrigerating trap. p mols of the phosphites or phosphonites of the formula IV containing carbamate groups are subsequently reacted to give the phosphonic acid esters or phosphinic acid esters I, at temperatures of from about 0° to 100°C, preferably 10° to 60°C, with at least 1 mol of the unsaturated substances V in the presence of alkaline catalysts, preferably alkali alcoholates.

As compounds of the formula V may be considered especially:

for $p = 1$: acrylonitrile, acrylamide, methacrylonitrile, methacrylamide, vinylphosphonic acid esters such as vinylphosphonic acid dimethyl or diethyl ester, vinylmethylphosphinic acid-isobutyl ester, vinyldimethylphosphinoxide, vinyl-sulfonamide etc.;

for $p = 2$: methylene-bisacrylamide, divinyl-sulfone;

for $p = 3$: 1,3,5-tris-acryloyl-hexahydro-1,3,5-triazine.

Since the compounds of the formula IV are mostly liquid the addition of solvents in the above reaction is generally not required. However, it is possible to add suitable solvents such as dioxane, tetrahydrofurane etc. The phosphonic acid or phosphinic acid esters I are formed at a pH-value of about 8 to 11 liberating partly considerable heat, so that cooling may be necessary.

The compounds of the formula I may be fixed fast to washing directly on the fibrous material in combination with about 5 to about 150 percent by weight, preferably 10 to 50 percent by weight of substances, which contain at least two groups of the formula

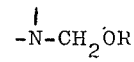

R being hydrogen or a hydrocarbon radical having 1 to 4 carbon atoms, that means with for example N-methylol compounds or N-methylol ethers on the basis of 1,3,5-amino-triazines or ureas or cyclic ureas, if desired, while using the usual acidic cross-linking catalysts mentioned below. It is also possible to methylolize the compounds of the formula I previously by reaction with formaldehyde. If the radical X itself cannot bind any formaldehyde, 1 to 2 mols of formaldehyde, preferably 1.0 to 1.2 mols are sufficient. An excess may also be present. If X represents —CO—NH$_2$ for example, altogether 4 mols of formaldehyde can be bound theoretically, since the acrylamide group is formalized at least once. Metholization is carried out according to known methods at about 20° to 80°C. 1.0 to 1.2 molecules of formaldehyde per each —NH$_2$-group are preferably used.

According to the invention, the resulting N-methylol compounds (I) can be fixed on fibrous materials having various compositions, individually, for an improved resistance to washing, but preferably also in combination with substances containing at least two groups of the formula

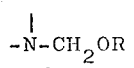

Such compounds to improve the resistance to washing are for example:

Derivatives of amino-1,3,5-triazines such as trimethylolmelamine, hexamethylolmelamine, trimethylolmelamine-dimethyl-ether, hexamethylolmelamine-pentamethyl ether, trimethylolmelamine-triisobutyl ether, dimethylol-acetoguanamine, furthermore derivatives of urea such as dimethylol-urea, dimethylol-urea-dimethyl ether, dimethylol-urea-dibutyl ether, dimethylol-cyclo-ethylene-urea, dimethylol-cyclopropylene-urea, dimethylol-4-methoxy-5-dimethylpropylene-urea, dimethylol-5-hydroxypropylene-urea, 1,3-dimethylol-4,5-dihydroxyimidazoline-(2),1,3-dimethylol-5-hydroxyethyl-hexahydrotriazinone-(2), dimethylol-urone and dimethylol carbamates such as for example dimethylol-methyl carbamate, dimethylol-hydroxy-ethyl carbamate, dimethylol-ethoxyethyl carbamate etc.

Especially interesting compounds of this type are the melamine derivatives, such as for example especially hexamethylol-melamine-pentamethyl ether.

As cross-linking catalysts are generally used about 0.2 to 5 percent by weight, preferably 0.4 to 3 percent by weight, of organic or inorganic acids or the salts thereof which set free acid by hydrolysis or by a heat treatment, such as, for example, sulfuric acid, hydrochloric acid, phosphoric acid, oxalic acid, glycolic acid, lactic acid, monochloro-acetic acid, trichloro-acetic acid, maleic acid, tartric acid, citric acid, acetic acid, formic acid or the salts thereof with ammonia, amines or with oxides or hydroxides of polyvalent metals, such as ammonium sulfate, ammonium chloride, mono- and di-ammonium phosphate, diammonium-oxalate ammonium nitrate, magnesium chloride, aluminum chloride, zinc chloride, zinc nitrate, zinc fluoborate, ethanolammonium chloride or 1-hydroxy-2-methyl-propylammonium-2-chloride. The cross-linking catalysts may be added to the finishing baths individually or in mixture with one another. These finishing baths usually contain about 2 to 5 percent by weight, preferably 3 to 4.5 percent by weight of phosphorus, the carrier of which are the compounds of the formula I, furthermore about 5 to 10 percent by weight, preferably 7 to 9 percent by weight of substances capable of being cross-linked, as indicated above, besides about 0.2 to 5 percent by weight of cross-linking catalysts, as well as, if desired, about 5 to 25 percent by weight, preferably 10 to 20 percent by weight of high polymer plastics or plastics dispersions.

As textile fibre materials are considered fibres or fabrics of native or regenerated cellulose or the mixtures thereof. Surprisingly, excellent permanent flame-proofing effects are obtained on totally synthetic fibre materials, especially on mixed fibre fabrics. As totally synthetic or mixed fibre material are also suitable especially so-called "non-woven-fabrics," for example, needle felts for wall and floor coverings having very different compositions, such as for example needle felts consisting of polyester/polyamide fibres in the weight ratio of 50/50, polyamide fibres and viscose rayon 50/50, polyester fibres/viscose rayon 50/50, polyamide fibres/-viscose rayon 75/25, polyester fibres/viscose rayon 75/25, polyamide/polyacrylonitrile and polyester fibres 50/25/25, polyamide/jute fibres 50/50 and other fibres.

"Non-woven-fabrics" are also fibre fleeces bonded by binding agents, as they are used for insulating purposes (for example as inserts) and for wet and dry filters. In this case either pure synthetic fibres such as polyester or polyamide or mixtures of these fibres with one another or with viscose rayon are considered.

The flame-proofing process according to the invention is carried out under conditions of application usual in textile industry. The fabrics or needle felts are treated with the aqueous finishing baths, expediently on a two roller or three roller foulard, squeezed off and subjected to a drying and/or condensation process. The fleeces bonded by binding agents are expediently reinforced either on a foulard or by spraying or foaming the binder mixture.

For the flame-proof finish of cellulose fibre fabrics, the action of heat can preferably be effected in 2 steps. At first the fabrics are dried at a temperature above about 50°C, preferably at about 100° to 120°C, in order to remove the water, except for a remaining value of about 4 to 8 percent and subsequently the condensation is effected at about 140° to 180°C during about 7 to 3 minutes.

The needle felt material for wall-to-wall carpets can also be dried and condensed according to the 2-step process. Cross-linking preferably takes place in a one-step drying or condensation process at about 120° to about 180°C, mostly at 145°–160°C.

On the average, the heat treatment takes about 10 to about 60, preferably 20 to 30 minutes. The action of heat expediently takes place in drying cabinets, on stretching frames, hotflues or condensation frames.

Further finishing agents such as textile softening agents, hydrophobing products, oleophobing agents or anti-microbial finishing products may be added to the finishing baths.

To get a good handle of cellulose fibre fabrics, to obtain a good dimensional stability, to improve the abrasion and the scuff-resistency of the needle felt carpet material, high-polymer plastics or plastics dispersions or known finishing substances may be added to the finishing baths, for example on the basis of polyvinyl acetate, polyvinyl-acetate with plastics softening agents, such as dibutylphthalate, mixed polymers of vinyl acetate with maleic acid dibutyl ester, mixed polymers of acrylic acid butyl ester with N-methylolacrylamide, mixed polymers of acrylic acid butyl ester, N-methylol-acrylamide and acrylic acid, mixed polymers of acrylic acid butyl ester, N-methylol-acrylamide and N-methylolmethacrylamide, mixed polymers of acrylic acid butyl ester, methacrylic acid methyl ester and methylol-meth crylamide, mixed polymers of acrylic acid butyl ester, acrylonitrile, N-methylol-acrylamide and methacrylic acid, mixed polymers of acrylic acid butyl ester, acrylic acid ethyl ester, acrylonitrile, N-methylol-methacrylamide and acrylic acid, mixed polymers of acrylic acid butyl ester, styrene, acrylonitrile and N-methylol-methacrylamide, N-methylol-methacrylamide and butane-diol-diacrylate, mixed polymers of acrylic acid methyl ester and acrylic acid butyl ester, mixed polymers of ethylacrylate, acrylonitrile and N-methylolacrylamide, mixed polymers of butyl-acrylate, vinyl acetate with N-methylolamide, mixed polymers of butyl-acrylate, acrylonitrile and N-methylolacrylamide, mixed polymers of styrene, butyl-acrylate and acrylic acid, natural latex or synthetic latexes from styrene with butadiene.

Needle felts having a flame-proof finish according to the present invention to which are applied, as already mentioned, besides the flame-proof component, plastics dispersions, show in wear tests a considerably reduced tendency to soiling with regard to the needle felts which have been treated only with plastics dispersions to improve the dimensional stability.

The needle felts finished according to the invention also show a reduced electrostatic charge.

In contradistinction to the commercial flame-proofing agents on the basis of 3-(dimethyl-phosphono)-propionic acid amide the products of the present invention have great advantages especially with regard to the permanence of the finishes obtained on synthetic "non-wovens," for example needle felts having different fibre components.

EXAMPLES FOR PREPARING THE NOVEL COMPOUNDS

EXAMPLE 1

Preparation of 2-cyano-ethane-phosphonic acid-ethyl(2'-carbamato-ethyl)-ester

In a 4-liter four neck flask which contained 722 g (10.62 mols) of about 25 percent aqueous ammonia, 849 g (9.65 mols) of ethylene carbonate were introduced portionwise at 20° to 40°C while cooling in about 30 minutes while stirring. Stirring was continued for 3 hours at about 40°C, then the batch was heated in vacuo of at first about 25 mm mercury, then, of 10 mm mercury, for a total of about 2 hours to 125°–130°C. Water and other easily volatile contaminations were distilled off to a large extent. A residue of about 1000 g (9.14 mols) remained which represented according to the gas chromatogram (in the following: GC) a 95 to 97 percent hydroxyethyl carbamate. This residue was mixed with 1150 g (8.33 mols) of diethyl-phosphite, 0.1 g of thymol-phthaleine as an indicator and 8 g of sodium methylate.

Then the internal temperature was slowly increased, while stirring, to 50°C, at a vacuum of 5 to 20 mm mercury. The ethanol distilling off was condensed in two refrigerating traps cooled with $CO_2$/methanol. After every 2 hours — 4 times altogether — the condensation was interrupted and 5 g of sodium methylate were added in each case. Altogether about 380 to 400 g (8.3 mols) of ethanol were distilled off, which contained about 1 percent of methanol and about 3 percent of diethyl phosphite. Duration of esterification: about 16 hours.

The refraction index, measured at 22°C was between about $n = 1.4590$ and $1.4600$.

Then, at 20°–40°C, 440 g (8.3 mols) of acrylonitrile and simultaneously, 30 to 40 g of a 33 percent sodium methylate solution in methanol were added within about 45 minutes while cooling in such a manner that the solution remained blue, which corresponded to a pH-value of 8 to 9, measured Merck-universal-indicator-papier."moist "Merck-universal-indicator-Papier." Stirring was continued for 30 minutes at pH 7 to 9.

Yield: about 2080 g of crude phosphonic acid ester having a contents of phosphorus of 11.4 percent.

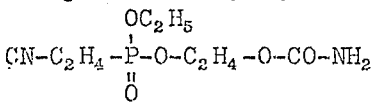

molecular weight 250.20

In the IR-spectrum the P-H-band (at 2350–2440 $cm^{-1}$) had disappeared.

The product could be further purified according to known methods; however, it was preferably further processed in the state in which it was obtained.

The process could be carried out in the same way, if instead of 28 g of sodium methylate altogether 36 g of sodium ethylate or 44 g of anhydrous sodium carbonate were used as catalysts in transesterification.

EXAMPLE 2

Preparation of the N-methylol compound of the phosphonic acid ester of Example 1

2080 g of the product of Example 1 were introduced in the course of about 10 minutes, while stirring, into 740 g (9.13 mols) of a 37 percent aqueous formaldehyde solution and adjusted to pH 9–10 with about 10 g of a 33 percent sodium hydroxide solution whereby the reaction mixture became warm.

Stirring was continued for 1 hour at 40–50°C and the pH value was readjusted several times with about 10 g of a 33 percent sodium hydroxide solution in each case.

Altogether about 2900 g of an aqueous solution of the methylol compound were obtained having a P-contents of 8.5 percent.

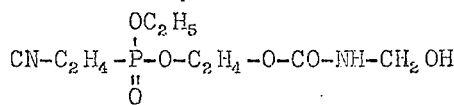

molecular weight 280.23

EXAMPLE 3

Preparation of 2-(diethylphosphono)-ethane-phosphonic acid methyl-(2'-N-hydroxymethyl-carbamato-ethyl)-ester 678 g (6.3 mols) of a 97.6 percent hydroxyethyl carbamate, which were prepared in analogy to Example 1, were mixed at room temperature with 660 g (6.0 mols) of freshly distilled dimethyl phosphite and 0.1 g of thymol-phthaleine-indicator. Then 13 g of a 33 percent solution of sodium methylate in methanol were added. The solution turned blue. In the oil pump vacuum, 211.5 g of methanol were distilled off at 20°–25°C and 1 mm mercury within 16 hours and condensed in a refrigerating trap cooled with $CO_2$/methanol. A residue of 1122 g remained. At 20°–40°C, while cooling with ice, 984.7 g (6 mols) of vinyl-phosphonic acid diethyl ester and at the same time 96 g of a 33 percent solution of sodium methylate in methanol were added dropwise to this residue in about 60 minutes, in such a way that the solution always maintained the blue color. Stirring was continued for 15 minutes. After addition of 583 g (7.2 mols) of a 37 percent aqueous formaldehyde, a pH-value of 9 to 10 was adjusted with 60 g of a 33 percent sodium hydroxide solution and maintained for 1 hour. The reaction temperature was 30°–40°C.

2845 g of an aqueous solution of the N-methylol compound were obtained, having a P-contents of 12.4 percent.

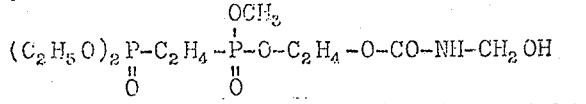

molecular weight 377.28

EXAMPLE 4

Preparation of 2-(N-hydroxymethyl-carbamoyl)-ethane-phosphonic acid ethyl-(-2'-N-hydroxymethyl-carbamato-ethyl)-ester 238 g (2 mols) of an about 97 percent hydroxyethal carbamate, 276 g (2 mols) of freshly distilled diethyl phosphite, 0.1 g of thymol phthaleine and 7 g of a 33 percent solution of sodium methylate in methanol were mixed at room temperature. After evacuating to 0.5 mm mercury 101 g altogether were distilled off at 17°–22°C and condensed in a refrigerating trap. A residue of 420 g remained. At 50°–60°C, within 30 minutes, 142 g (2 mols) of acrylamide and simultaneously 12 g of a 33 percent solution of sodium methylate in methanol were added with stirring to this residue in a way that the solution always just maintained the blue color. Stirring was continued for 30 minutes at 40°C and the methylolization was effected after addition of 390 g (4.8 mols) of a 37 percent aqueous formaldehyde at 30°–35°C and at a pH-value of 9 to 10. To adjust the alkaline medium altogether 41 g of a 33 percent sodium hydroxide solution were necessary.

1000 g of an aqueous solution of the methylol compound having a P-contents of 6.2 percent were obtained.

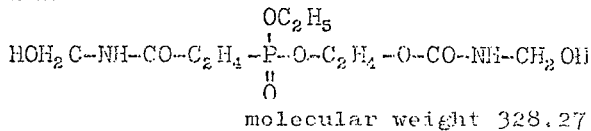

molecular weight 328.27

EXAMPLE 5

Preparation of 2-(dimethylphosphono)-ethane-phosphonic acid-ethyl-(2'-N-hydroxymethyl-carbamato-ethyl)-ester 721 g (6.6 mols) of about 96 percent hydroxyethyl carbamate, 828 g (6 mols) of diethyl phosphite (freshly distilled), 0.1 g of thymolphthaleine indicator and 20 g of a 33 percent solution of sodium methylate in methanol were transesterified at 25°–28°C and a pressure of 1.8 to 2.0 mm mercury, while splitting off 285 g of ethanol. 1290 g of crude ethyl-(2-carbamato-ethyl)-phosphite remained.

107.5 g (1/2 mol) of this phosphite were mixed at 20°C with 1 g of solid sodium methylate and at 20°–30°C, 68 g (1/2 mol) of vinyl phosphonic acid dimethyl ester were added dropwise, while cooling with ice, in the course of 40 minutes. The bath was stipped for 30 minutes, 48.5 g (0.6 mol) of 37 percent aqueous formaldehyde were added and at 25°C, a pH-value of 9 to 10 was maintained for 1 hour with altogether 4 g of a 33 percent sodium hydroxide solution.

22 g of an aqueous solution of the methylol compound were obtained, which had a contents of P of 13.4 percent.

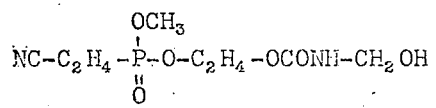

molecular weight 363.25 molecular weight 840.68

EXAMPLE 6

Preparation of 2-cyano-ethane-phosphonic acid-methyl-(2'-hydroxymethyl-carbamato-ethyl)-ester 220 g (about 2.1 mols) of about 97 percent hydroxyethyl carbamate, 220 g (2 mols) of dimethyl phosphite (freshly distilled), 0.05 g of thymol phthaleine indicator and 4 g of a 33 percent solution of sodium methylate in methanol were stirred at a pressure of 0.2 to 0.5 mm mercury at 15°–25°C, until in a refrigerating trap cooled with $CO_2$/methanol 71.5 g were condensed. According to the GC this condensate was a mixture of 92.9 percent of methanol and 6.9 percent of dimethyl phosphite. Thus, about 66.2 g (2.07 mols) of methanol were distilled off.

374 g remained as residue which was reacted within 40 minutes at 20°–30°C, while cooling with ice, with 106 g (2.0 mols) of acrylonitrile. As a catalyst altogether 12 g of a 33 percent solution of sodium methylate in methanol were added while stirring in the same time, in a way that a blue color was always just maintained. Stirring was continued for 30 minutes and the mixture was methylolized by simultaneous addition of 195 g (2.4 mols) of a 37 percent aqueous formaldehyde and 5 g of a 33 percent sodium hydroxide solution at 35°–40°C.

690 g of a colorless solution of the N-methyol compound were obtained, which had a contents of P of 9.0 percent.

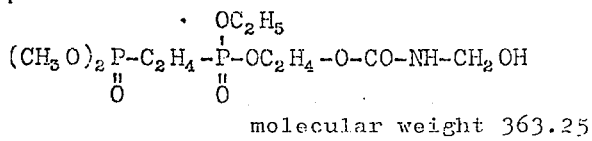

molecular weight 266.20

EXAMPLE 7

Preparation of 1,3,5-tris-[2-(ethyl-2'-carbamato-ethyl-phosphono)-propionyl]-hexahydro-1,3,5-triazine From 721 g (about 6.6 mols) of about 97 percent 2-hydroxyethylcarbamate, 828 g (6.0 mols) of diethyl phosphite, 0.1 g of thymol phthaleine indicator and 6 g of sodium methylate the carbamate group containing phosphite was prepared in analogy to Example 1. 220 g (corresponding to about 1 mol) of this phosphite were stirred with 100 g of methanol, 0.2 g of semicarbazide hydrochloride and 83.1 g (1/3 mol) of 1,3,5-trisacryloyl-hexahydro-1,3,5-triazine at room temperature. While cooling, at 20°–30°C, 6 g of a 33 percent solution of sodium methylate in methanol were added dropwise in a way that the mixture always just maintained the blue color.

408 g of a colorless solution of the tris-phosphonic acid ester were obtained which showed a contents of P of 7.6 percent and a contents of N of 6.8 percent.

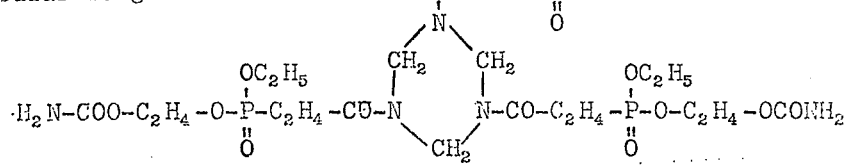

EXAMPLE 8

Preparation of bis-[2-(ethyl-2'-carbamato-ethyl-phosphono)-ethyl]-sulfone

To 220 g of the carbamate group containing phosphite of Example 7 (corresponding to about 1 mol)

were added dropwise at 30°–40°C, within 2 hours, while cooling with ice, 59 g (1/2 mol) of divinyl sulfone. Simultaneously, altogether 6.5 g of a 33 percent solution of sodium methylate in methanol were slowly added dropwise as a catalyst, so that the reaction mixture always just remained blue, and finally 20 g of methanol were added.

306 g of a colorless clear crude product were obtained, which showed a contents of P of 10.1 percent, a contents of N of 4.6 percent and a contents of S of 5.2 percent.

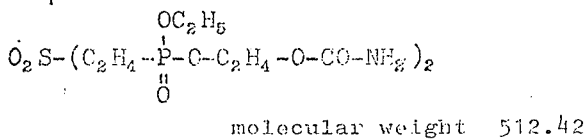

molecular weight 512.42

EXAMPLE 9

Preparation of bis-[2-(ethyl-2'-carbamato-ethyl-phosphono)-propionylamino]-methane Into a mixture of 220 g (about 1 mol) of a carbamate group containing phosphite obtained according to Example 7, with 0.2 g of semi-carbazide hydrochloride, which was heated to 55°–65°C there were introduced within about 2 hours while cooling slightly 77 g (1/2 mol) of solid methylene bisacrylamide. During this time altogether 15 g of a 33 percent solution of sodium methylate in methanol were introduced simultaneously as a catalyst. The methylene bisacrylamide was completely dissolved.

342 g of a viscous colorless crude product were obtained which had a contents of P of 9.1 percent and a contents of N of 8.2 percent.

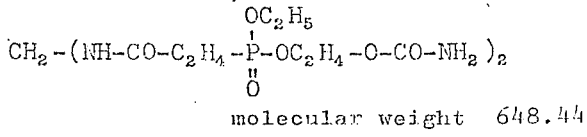

molecular weight 648.44

EXAMPLE 10

Preparation of methyl-2-cyanoethyl-phosphinic acid-2'-carbamatoethyl ESTER 120 g (1.1 mol) of about 96 percent 2-hydroxyethyl-carbamate, 136 g (1 mol) of methane-phosphonous acid isobutyl ester, 0.02 g of thymol phthaleine indicator and 3.5 g of solid sodium methylate were heated slowly at 1 mm mercury within 14 hours, from 35° to 70°c. Altogether 74 g were distilled off, the distillate contained according to the GC 95.8 percent, that is about 71 g (0.96 mol) of isobutanol. The residue was reacted at 25°–40°C, while cooling with ice, with 53 g (1 mol) of acrylonitrile. A 33 percent solution of sodium methylate in methanol served as a catalyst. 250 g of crude product were obtained, which had a contents of P of about 12.4 percent, calculated 14.12 percent

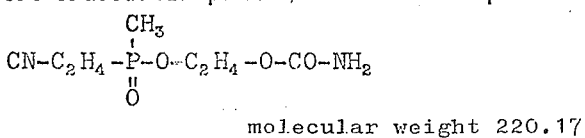

molecular weight 220.17

EXAMPLE 11

Preparation of 2-cyanoethane-phosphonic acid-ethyl-(1'-methyl-2'-N-hydroxymethyl-carbamato-ethyl)-ester 136 g (1.1 mol) of an about 96 percent 2-hydroxy-propyl-carbamate obtained from 1.2-propylene-carbonate and ammonia, 138 g (1 mol) of diethyl phosphite, a little amount of thymol-phthaleine indicator and 2 g of sodium methylate (solid) were heated slowly at 15–20 mm mercury to 80°C. 46 g distilled into a refrigerating trap. The refraction index of the residue was $n_{22}$ = 1.45199.

At 20°–30°C, within 30 minutes, 53 g (1 mol) of acrylonitrile and simultaneously 7 g of a 33 percent solution of sodium methylate in methanol were added dropwise, while cooling, until the reaction was finished. Methylolization was carried out by addition of 89.2 g (1.1 mol) of 37 percent aqueous formaldehyde and 7 g of a 33 percent sodium hydroxide solution at 35°–40°C and a pH-value of 9 to 10.

Yield: 393 g of an aqueous solution of the methylol compound which had a contents of P of 7.9 percent.

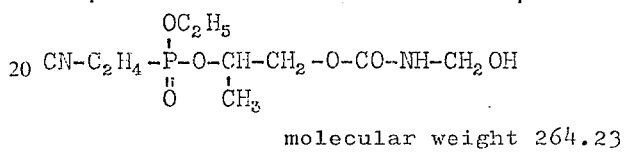

molecular weight 264.23

EXAMPLE 11a

When the reaction was carried out in analogy to Example 2 but instead of 740 g (9.13 mols) of the 37 percent aqueous formaldehyde solution 1 480 g (18.26 mols) were used, about 3 635 g of a solution were obtained, which contained predominantly the dimethylol compound

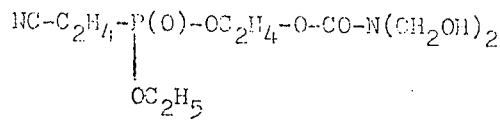

The contents of P was about 7.1 percent.

EXAMPLES OF APPLICATION

EXAMPLE 12

A 320 g/m² cotton fabric, dyed with Indanthrene dyestuffs was treated on a two roller foulard (padding mangle) with an aqueous solution, which contained 350 g/l of the reaction product of Example 2, 40 g/l of hexamethylol-melamine-pentamethyl ether and 4 g/l of ammonium chloride. The squeezing off effect (take-up of liquor, referred to the dry weight of the fabric) was 75 percent. Then the fabric was pre-dried at 120°C to a remaining moisture contents of about 6 percent. The condensation was carried out for 4 minutes at 170°C. Subsequently it was rinsed for 7 minutes with 2 g/l of a sodium carbonate solution at 90°C and then rinsed until free of alkali.

The finished fabric showed a very good flame resistance according to DIN 53 906, (corresponding to ASTM-D 1230.61 and AATCC-34.1966) which survived at least 15 machine washes at the boil with 10 g/l of a commercial heavy duty detergent, the feel of the fabric was soft and flowing.

EXAMPLE 13

A furnishing fabric of 100 percent cotton (250 g/m²) printed with Indanthrene dyestuffs was treated, as described in Example 12, with an aqueous solution which contained 400 g/l of the reaction product of Example 2, 30 g/l of hexamethylol-melamine-pentamethyl ether, 10 g/l of urea and 5 g/l of ammonium chloride. After squeezing off on the two roller foulard the contents of moisture was about 75 percent. Subsequently the fabric was predried as in Example 12 at 120°C and condensed for 4 minutes at 170°C. It was washed for 7 minutes with 2 g/l of sodium carbonate solution at 90°C. It was rinsed free from alkali and dried at 100°C. The furnishing material was distinguished by a very good and permanent flame-proof effect fast to wet washing and dry cleaning. The feel was soft and flowing. Furthermore, the fabric showed a good crease recovery in the dry and wet state.

EXAMPLE 14

The cotton fabric described in Example 12 was treated with an aqueous solution which contained 400 g/l of a solution obtained according to Example 3, of the phosphoro-organic compound having the following constitution $$(C_2H_5O)_2P(O)—C_2H_4—P(O)(OCH_3)—O—C_2H_4—O—CO—NH—CH_2OH,$$

40 g/l of hexamethylol-melamine-pentamethyl ether and 4 g/l of ammonium chloride. After squeezing off the fabric on the two roller foulard, it was pre-dried again at 100°–120° and then cured for 4 minutes at 170°C. Washing was carried out for 7 minutes with 2 g/l of a sodium carbonate solution at 90°C. The fabric was rinsed free from alkali and subsequently dried at 100°C.

According to DIN 53 906 the cotton fabric showed a very good flame-proof effect which endured several washes at 60°C.

EXAMPLE 15

The furnishing material mentioned in Example 13 (100 percent cotton) was treated with an aqueous impregnation solution which contained 420 g/l of the reaction product obtained according to Example 6 from 1 mol of dimethyl phosphite, 1.1 mol of hydroxyethyl carbamate, 1 mol of acrylonitrile and 1.2 mols of formaldehyde. Furthermore, 45 g/l of hexamethylol-melamine-pentamethyl ether and 4.5 g/l of ammonium chloride were added. The fabric was treated, pre-dried and washed as described in Example 12. The cotton fabric thus treated was also characterized by a soft and flowing feel; the flame-proof effect endured several machine washes at 60°C.

EXAMPLE 16

450 g/l of a solution of a phosphoro-organic compound having the following constitution

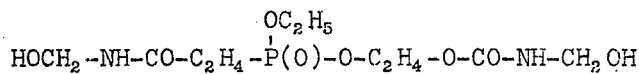

obtained according to Example 4 to which were also added 40 g/l of hexamethylol-melamine-pentamethyl ether and 4 g/l of ammonium chloride, served as aqueous treating bath for a cotton furnishing material (220 g/m², dyed with a blue Indanthrene dyestuff). The liquor pick-up on a two roller foulard was about 70 percent. After treating on the foulard the fabric was pre-dried at 130°C and cured for 4 minutes at 170°C. Washing with 2 g/l of sodium carbonate solution was carried out under the conditions described in Example 12.

The treatment described above provided on the cotton fabric a good flame-proof finish which was permanent towards wet washing and dry cleaning.

EXAMPLE 17

An impregnation solution which contained 400 g/l of an aqueous solution, obtained according to Example 5, of a compound containing phosphorus of the following composition

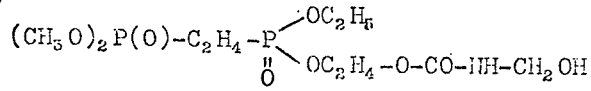

furthermore 40 g/l of hexamethylol-melamine-pentamethyl ether, 5 g/l of urea and 4 g/l of ammonium chloride, was used for treating a cotton furnishing material (250 g/m², dyed with a red Indanthrene dyestuff) on a two roller foulard. The liquor pick-up was 75 percent. The fabric was subsequently pre-dried at 110°C and then condensed for 4 minutes at 170°C. After condensation the fabric was washed with 2 g/l of sodium carbonate at 90°C. After rinsing the fabric free from alkali it was dried at 95°C.

The fabric showed a soft feel and a good permanent flame-proof effect according to DIN 53 906.

EXAMPLE 18

A spun rayon non-woven fabric (200 g/m²) was treated with a finishing bath as described in Example 12. The rayon fleece was pre-dried at 100°C and then cured for 5 minutes at 155°C. The material showed elasticity in the feel and had a very good flame resistency.

EXAMPLE 19

A needle felt consisting of a fibre mixture of 50 percent of polyamide-6 and 50 percent of viscose rayon fibres was treated on a two roller foulard with an aqueous impregnation solution which had the following composition:

400 g/l of a reaction product obtained according to Example 1, 85 g/l of hexamethylol-melamine-pentamethyl ether and 4 g/l of ammonium chloride. The liquor pick-up was 100 percent. Then the material was dried for 25 minutes at 150°C. The needle felt provided with a flame-proof finish showed a soft, silghtly full feel and a very good flame-proof effect. The flame-proofing test was carried out according to the American motor vehicle safety norm No. 302, concerning the inflammability of materials in motor cars having passenger compartments, in motor cars for various purposes, trucks and buses.

Flame exposure time: 15 seconds.

A needle felt sample unfinished, continued to burn in a large front after removal of the burner. The flame front ran over a distance of 10 cm in a burning time of 2 minutes and 30 seconds. On the contrary, the finished sample extinguished after removing the burner. After a washing process for delicate materials with 2 g/l of a commercial light-duty detergent (action 15 minutes at 40°C) the needle felt also stopped burning after removing the flame. After 5 shampooing processes the flame-proof effect was maintained. After removing the flame, the material continued to burn for only 10 seconds, then it extinguished itself.

EXAMPLE 20

A needle felt consisting of a fibre mixture of 50 percent of poly amide-6 and 50 percent of polyester fibres, was treated, as described in Example 19, on a two roller foulard with an aqueous impregnation solution, which contained in addition to the chemicals already mentioned in Example 19 (that is 400 g/l of a reaction product obtained according to Example 1, 85 g/l of hexamethylol-melamine-pentamethyl ether, 4 g/l of ammonium chloride) 200 g/l of a 40 percent plastics dispersion of a mixed polymer of ethyl acrylate/acrylonitrile/N-methylolacrylamide in the ratio of 6:3:1. The liquor pick-up was 100 percent. Subsequently the material was dried for 25 minutes at 150°C. The needle felt had a very good permanent flame-proof effect which allowed several washing processes for delicate materials at 50°C and several shampooing processes.

The flameproof test was carried out again according to U.S.-motor vehicle safety norm No. 302. A sample finished with only 200 g/l of the plastics dispersion mentioned continued to burn after removing the flame over a test distance of 10 cm in 3 minutes and 10 seconds.

On the contrary, the sample provided with a flame-proof finish stopped burning after removing the flame. After 5 shampooing processes the sample continued to burn for 40 seconds, after this time the flame was extinguished.

Furthermore, the needle felt showed a very good dimensional stability and, surprisingly, an improved resistance to abrasion compared with a needle felt only finished with the plastics dispersion. The elasticity of the neddle felt was considerably improved. Moreover, the needle felt had a considerably improved anti-soiling effect, related to a needle felt which was treated with the plastics dispersion only.

EXAMPLE 20a

In order to demonstrate the improved permanence of the compounds of the present invention with regard to a commercial product on the basis of 3-(dimethyl-phosphono)-propionic acid amide, the following comparative tests were carried out:

A synthetic needle felt, consisting of 50 percent of polyamide-6 and of 50 percent of polyester fibres was finished as described in the above Example. Instead of (A) 400 g/l (11.4 percent P) of the reaction product obtained according to Example 1, (B) 267 g/l of 3-(dimethyl-phosphono)-propionic acid amide (17.1 percent P), or (C) 530 g/l (8.5 percent P) of methylolized carbamate prepared according to Example 2, or (D) 400 g/l of the N-methylol-3-(dimethyl-phosphono)-propionic acid amide (about 11 percent P) were used.

The flameproofing test was carried out again according to U.S.-safety norm No. 302 (cf. Table p. 38).

EXAMPLE 21

A needle felt consisting of 50 percent of polyamide-6 and 50 percent of viscose rayon was treated on a two roller foulard with a finishing bath which contained 300 g/l of a reaction product obtained according to Example 1 (of 1 mol of diethyl phosphite, 1.1 mol of hydroxyethyl carbamate, 1 mol of acrylonitrile), 75 g/l of hexamethylol-melamine-pentamethyl ether, 4 g/l of ammonium chloride and 100 g/l of a plastics dispersion of polyvinyl acetate. The liquor pick-up in the treatment on the foulard was 100 percent. The needle felt showed a full elastic feel and a very good permanent flame-proof effect.

The flame-proof test was effected according to U.S.-motor vehicle safety norm. No. 302. A needle felt sample, finished with 100 g/l of polyvinyl acetate dispersion continued to burn after removing the flame; the flame front run over a test distance of 10 cm in 2 minutes and 15 seconds. However, a sample treated with the finishing bath described above, extinguished after removing the flame. After 2 washing processes with 2 g/l of a commercial light-duty detergent (action 10 minutes) at 50°C, an after-burning-time of 30 seconds was measured, the sample then did not continue to burn. After 5 shampooing processes the flame-proof finish was not affected. The after-burning time was only 25 seconds; the test specimen then did not continue to burn.

EXAMPLE 22

The needle felt mentioned in Example 21 was used and the finishing bath which contained instead of the polyvinylacetate dispersion 200 g/l of a 40 percent plastics dispersion, consisting of a mixed polymer of butyl acrylate/vinyl acetate/N-methylol acrylamide (35:55:10). Application was effected on a two-roller foulard with a squeezing-off effect of 110 percent. Then the fabric was dried for 25 minutes at 150°C.

The needle felt showed an elastic feel having a good permanent flameproof effect.

EXAMPLE 23

A needle felt consisting of 75 percent of polyamide-6 and 25 percent of viscose rayon was treated with 350 g/l of a reaction product obtained according to Example 1 (of 1 mol of diethyl phosphite, 1.1 mol of hydroxyethyl carbamate, 1 mol of acrylonitrile), 35 g/l of hexamethylol-melamine-pentamethyl ether and 40 g/l of dimethylol-urea on a two-roller foulard. The aqueous finishing bath furthermore contained 4 g/l of ammonium chloride and 200 g/l of a 50 percent plastics dispersion, consisting of a mixed polymer of butyl acrylate/acrylonitrile/acrylic acid (90:7:3). The liquor pick-up was 100 percent, drying was effected for 23 minutes at 155°C.

The very elastic needle felt was distinguished by a very good flameproof effect.

EXAMPLE 24

The needle felt described in Example 19 was treated with an aqueous impregnation solution on a two roller foulard which contained 400 g/l of the solution of the phosphoro-organic compound mentioned in Example 5. In addition to this, the impregnation bath contained 40 g/l of hexamethylol-melamine-pentamethyl ether, 5 g/l of urea and 4 g/l of ammonium chloride was well as 200 g/l of the 40 percent plastics dispersion mentioned in Example 20. The liquor pick-up was 120 percent. The material was dried for 25 minutes at 150°C. The needle felt showed a good flameproof effect resistant to shampooing.

EXAMPLE 25

The needle felt described in Example 20 was treated on a two roller foulard with an aqueous finishing bath which contained 450 g/l of a reaction product obtained according to Example 2, and, furthermore, 85 g/l of hexamethylol-melamine-pentamethyl ether, 3 g/l of ammonium chloride and 70 g/l of magnesium chloride. Furthermore, 200 g/l of a 50 percent plastics dispersion were added consisting of a mixed polymer of butyl acrylate/acrylonitrile and N-methylol acrylamide (50:25:25). The liquor pick-up was 110 percent, drying was effected for 25 minutes at 150°C.

The needle felt had an aggreeable elastic and dry feel. The flameproof coating was resistant over several washing processes for delicate materials and it was resistant to shampooing. The flame-proof effect also remained stable with regard to organic solvents.

The flame-proofing test was carried out according to U.S.-motor vehicle safety norm No. 302. A needle felt finished with only 200 g/l of the above-mentioned 50 percent plastics dispersion had a burning speed of 3 minutes/10 cm.

Needle felt, provided with the above flame-proof finish: initial effect: continued to burn for 10 seconds. After 3 shampooing processes: continued to burn for 50 seconds.

EXAMPLE 26

A finishing bath containing 440 g/l of the solution obtained according to Example 8, of a phosphoro-organic compound of the following constitution

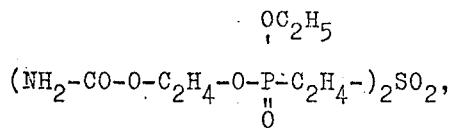

furthermore 85 g/l of hexamethylol-melamine-pentamethyl ether, 200 g/l of a 50 percent plastics dispersion consisting of a mixed polymer of butylacrylate/acrylonitrile and N-methylolacrylamide (50:25:25) and 5 g/l of ammonium chloride was used to treat on a two roller foulard a needle felt carpet material consisting of 50 percent of polyester and 50 percent of polamide fibres. The liquor pick-up was 110 percent. Subsequently the material was dried for 20 minutes at 150°C.

The needle felt showed a good permanent flameproof effect. Flameproof test according to U.S.-motor vehicle safety norm No. 302:

Initial effect: no after-burning.

1 washing (for delicate material): no after-burning.

3 shampooing treatments: after-burning for 20 seconds.

EXAMPLE 27

The finishing bath, with which the needle felt described in Example 26 was finished, consisted of 500 g/l of a phosphoro-organic compound having the following constitution

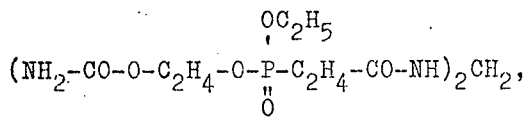

which was prepared according to Example 9, 200 g/l of a 40 percent plastics dispersion, described in Example 20, 85 g/l of hexamethylol-melamine-pentamethyl ether and 4.5 g/l of NH$_4$Cl.

The liquor pick-up was 105 percent, drying was effected for 20 minuutes at 150°C.

The needle felt had a very good flame resistance and an unchanged flameproof effect after 5 shampooings.

EXAMPLE 28

A needle felt carpet material provided for coating passenger compartments in motor cars consisting of 50 percent of polyamide fibres and 50 percent of spun rayon was treated on a two roller foulard effecting a liquor pick-up of 110 percent with the following aqueous finishing bath:

360 g/l of a reaction product prepared according to Example 10, 85 g/l of hexamethylol-melamine-pentamethyl ether, 5 g/l of ammonium chloride and 100 g/l of the 40 percent plastics dispersion described in Example 20.

Drying was effected for 20 minutes at 145°C.

The needle felt was distinguished by an agreeable feel and by a good dimensional stability. The flame-proof effect was very good and resisted several shampooing processes.

EXAMPLE 29

To 580 g of a reaction product of 1 mol of trisacryloformal with 3 mols of

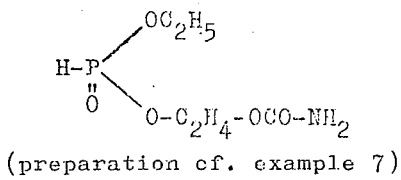

(preparation cf. example 7)

80 g of hexamethylol-melamine-pentamethyl ether, 150 g of a 50 percent polyvinyl acetate dispersion and 5 g of ammonium chloride were added and the mixture was completed with water to 1000 ml. Subsequently a needle felt carpet material consisting of 50 percent of polyester and 50 percent of polyamide-6-fibres was treated on the foulard (100 percent liquor pick-up) and dried for 20 minutes at 150°C.

The needle felt material had a good flame-proof finish and an agreeable elastic feel.

EXAMPLE 30

A needle felt carpet material consisting of 75 percent of spun rayon and 25 percent of polyamide fibres was treated with an aqueous impregnation solution having the following composition:

550 g/l of the reaction product of Example 2

60 g/l of hexamethylol-melamine-pentamethyl ether and 5 g/l of ammonium chloride.

The impregnation was effected on the foulard with a liquor pick-up of 110 percent. Subsequently the material was dried for 20 minutes at 155°C.

The needle felt material had a very good flame-proof effect resistant to shampooing.

EXAMPLE 31

A polyester carding fleece (200 g/m²) was impregnated on two-roller foulard with an aqueous solution which contained 400 g/l of a reaction product prepared according to Example 1, 200 g/l of a 40 percent polymer dispersion of a mixed polymer of butylacrylate/vinyl acetate/N-methylol-acrylamide (35:55:10), 85 g/l of hexamethylol-melamine-pentamethyl ether and 5 g/l of ammonium chloride. The roller pressure of the foulard was regulated in a way that a total pick-up of 24 percent, calculated on the weight of the fibres was obtained.

After impregnation the fleece was dried for 5 minutes at 150°C.

The skeined fleece had a slightly stiffened elastic feel and a very good flame-proof effect which was resistant to a washing process for delicate materials.

EXAMPLE 32

A polyamide irregular fleece (100 g/m²) was sprayed with an aqueous solution with the aid of spraying pistol, which contained 500 g/l of a reaction product obtained according to Example 2, 200 g/l of a 40 percent mixed polymer dispersion of butyl acrylate/vinyl acetate/N-methylol acrylamide (35:55:10), 125 g/l of hexamethylol-melamine-pentamethyl ether and 6 g/l of ammonium chloride. Spraying was dosed in a way that a pick-up in the dry state of 50 percent, calculated on the dry fibre material, was obtained. After spraying the material was dried at 140°C (10 minutes). A stiffened fleece having a good flame-proof effect was obtained, which was resistant to more than 25 machine washes for delicate materials (30°C).

EXAMPLE 33

A needle felt carpet material consisting of a fibre mixture of 50 percent of polyamide and 50 percent of viscose rayon fibres was treated on a two roller foulard with an aqueous finishing bath which had the following composition:

350 g/l of a reaction product of 1 mol of diethyl phosphite, 1.1 mol of hydroxyethyl carbamate and 1 mol of acrylonitrile (according to Example 1), 150 g/l of dimethylol urea, 100 g/l of a 40 percent plastics dispersion of a mixed polymer of ethyl acrylate/acrylonitrile/N-methylolacrylamide in the ratio of 6:3:1 and 6 g/l of NH₄Cl.

The liquor pick-up was 100 percent. Then the material was dried for 20 minutes at 145°C.

The needle felt had a very good permanent flame-proof effect which resisted several washing processes at 50°C and several shampooing processes.

The basis of the test was U.S.-motor vehicle safety norm No. 302. Burning time: 15 seconds.

The sample finished with only 200 g/l of the dispersion mentioned in the Example continued to burn in a large front after removing the flame and run over the test distance of 10 cm in 2 minutes and 30 seconds.

On the contrary, the flame-proof finished needle felt did not continue to burn after removing the flame. After glowing could not be observed.

After two washing processes for delicate materials with 2 g/l of a commercial light-duty detergent (washing time 15 minutes at 40°C) the needle felt did not continue to burn either, but an after-glowing time of 25 seconds was noted. After 5 shampooing processes the flame-proof effect was also maintained. After ignition the needle felt did not continue to burn. The after-glowing time was 20 seconds.

EXAMPLE 34

With an aqueous impregnation solution consisting of 330 g/l of a reaction product of 1 mol of diethyl phosphite, 1.1 mol of hydroxyethyl carbamate and 1 mol of acrylonitrile (according to Example 1), 45 g/l of hexamethylol-melamine-pentamethyl ether and 130 g/l of 1,3-di-methylol-4,5-dihydroxy-imidazolidone-(2)

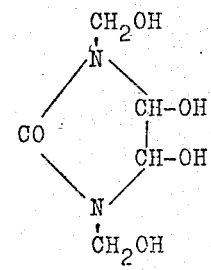

200 g/l of a 40 percent plastics dispersion consisting of a mixed polymer of butyl acrylate/vinyl acetate N-methylolacrylamide (35:55:10), 4 g/l of NH₄Cl and 25 g/l of MgCl₂, a needle felt carpet material (870 g/m²) consisting of 50 percent of polyamide-6-fibres and 50 percent of viscose rayon fibres, was treated on a two-roller foulard. Liquor pick-up was about 110 percent. Subsequently the material was dried for 25 minutes at 150°C. The needle felt showed an elastic feel and also after 3 washing processes for delicate materials, a very good dimensional stability. It had a good flame-proof finish. The flame-resistance was still maintained after 5 shampooing processes and 3 washing processes for delicate materials.

EXAMPLE 35

A needle felt carpet material consisting of 50 percent of polyester and 50 percent of polyamide-6-fibres was treated as described in Example 33, on a two-roller foulard with the same impregnation solution. The liquor pick-up was about 100 percent. The drying time was again 20 minutes at 145°C.

The needle felt material was elastic and showed a good dimensional stability even after 5 washing processes for delicate materials.

The very good flame-proof effect resisted to several shampooings.

EXAMPLE 36

The needle felt carpet material described in Example 33 was treated with a finishing bath which contained 450 g/l of a reaction product of 1 mol of diethyl phosphite, 1.1 mol of hydroxyethyl carbamate, 1 mol of acrylonitrile and 1.1 mol of CH₂O (according to Example 2), 150 g/l of 1,3-dimethylol-4,5-dihydroxy-imidazolidone-(2), 200 g/l of a 40 percent plastics dispersion, consisting of a mixed polymer of butyl acrylate/vinyl acetate/N-methylol-acrylamide (35:55:10), 6 g/l of NH₄Cl and 25 g/l of MgCl₂.

The treatment was effected on the two-roller foulard (105 percent of liquor pick-up).

The material was dried for 25 minutes at 150°C.

The needle felt material provided with a very good flame-proof finish had a good dimensional stability and a flame-proof effect resistant to shampooing and to washing for delicate materials.

Table

| g/l | Needle felt: | | Polyester/Polyamide-6 | | 50/50 | | | |
|---|---|---|---|---|---|---|---|---|
| A | 400 | 400 | | | | | | |
| B | | | 267 | 267 | | | | |
| C | | | | | 530 | 530 | | |
| D | | | | | | | 400 | 400 |
| plastics dispersion | 200 | 200 | 200 | 200 | 200 | 200 | 200 | 200 |
| synthetic resin | 170 | 250 | 170 | 250 | 170 | 250 | 170 | 250 |
| NH₄Cl | 6 | 6 | 6 | 6 | 6 | 6 | 6 | 6 |
| flame resistance after washing (delicate) 1) | 10" | 40" | burns | 3'50"(10) | 20" | 35" | burn< | 3'30"(10) |
| feel: initial | c | d | c | d | c | d | c | d |
| after 1 washing process (delicate) | c | d | a | b | c | d | a | c |

1)Flameproofing test according to US-Safety Norm No. 302; initial effect: good in all cases (Sample did not burn) 10" = continues burning for 10 seconds 3'50"(10)" = 10 cm of test distance are burnt in 3 minutes 50 seconds (etc.)
Estimation of the feel:
a) soft
b) slightly stiffened } insufficient fixation of the flameproofing agent
c) stiffened: with regard to the feel suitable as carpet material
d) very stiff: unsuitable as carpet material (not elastic)

We claim:
1. A compound of the formula

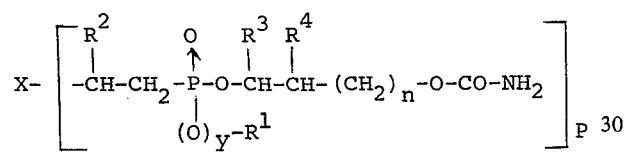

in which $R^1$ is alkyl of 1 to 4 carbon atoms or alkenyl of 3 or 4 carbon atoms, $R^2$, $R^3$ and $R^4$ are hydrogen or methyl, $n$ is an integer of zero to 2, $y$ is zero or 1, $p$ is an integer of 1 to 2 and,
 if $p = 1$, X is a group of the formula —CN, —CO—NH₂,

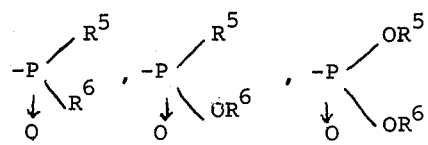

—SO₂—R⁷, —SO₂—NR⁸R⁹ or —SO₂—C₂H₄—OR⁷;
 if $p = 2$, X is a group of the formula —CO—NR⁸—(CH₂)q —NR⁹—CO— or —SO₂—,
 in which groups $R^5$, $R^6$ and $R^7$ have the meaning of $R^1$, $R^8$ and $R^9$ have the meaning of $R^2$ and $q$ is an integer of 1 to 6; and further the N-methylol derivatives of said compound.

2. A compound as defined in claim 1, in which $R^1$ is alkyl of 1 to 4 carbon atoms, $R^4$ is hydrogen, $n$ is zero and,
 if $p$ is 1, X is a group of the formula —CN, —CO—NH₂,

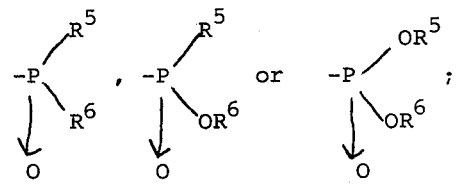

if $p$ is 2, X is a group of the formula —CO—NH—(CH₂)$_q$—NH—CO— or —SO₂—,
 in which $R^5$ and $R^6$ have the meaning of $R^1$ and $q$ is 1 or 2;
 and further the N-methylol derivatives of said compounds deriving from —CO—NH₂, —SO₂—NH₂ or both of these groups.

3. A compound as defined in claim 1, in which $R^1$ is methyl or ethyl, $R^2$, $R^3$ and $R^4$ are hydrogen, $n$ is zero, $p$ is 1, $y$ is 1 and X is cyano.

4. The N-methylol derivatives of a compound as defined in claim 3.

5. The compound as defined in claim 3, wherein $R^1$ is ethyl.

6. The compound as defined in claim 3, wherein $R^1$ is methyl.

7. A compound as defined in claim 1 in which $R^1$ is methyl or ethyl, $R^2$ and $R^4$ are hydrogen, $n$ is zero and if $p = 1$, X is a group of the formula —CN,

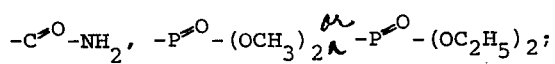

if $p = 2$, X is a group of the formula

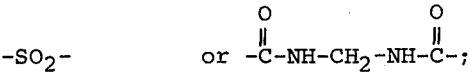

and further the N-methylol derivatives of said compound.

8. A compound as defined in claim 1, wherein $R^1$ is methyl or ethyl, $R^2$ is hydrogen, $R^4$ is hydrogen, $n$ is zero, $p$ is 1 and X is cyano, and the N-methylol derivatives thereof.

* * * * *